United States Patent [19]

Kato et al.

[11] Patent Number: 4,791,160
[45] Date of Patent: Dec. 13, 1988

[54] FLAME-RETARDANT RESIN COMPOSITIONS

[75] Inventors: Hiroshi Kato; Kazuhiko Kanemitsuya, both of Nishinomiya; Kiyoshi Furukawa, Kobe, all of Japan

[73] Assignee: Mitsubishi Cable Industries, Ltd., Hyogo, Japan

[21] Appl. No.: 12,234

[22] Filed: Feb. 9, 1987

Related U.S. Application Data

[63] Continuation-in-part of Ser. No. 841,136, Mar. 19, 1986, abandoned.

[30] Foreign Application Priority Data

Mar. 20, 1985 [JP] Japan .................... 60-56301
Mar. 20, 1985 [JP] Japan .................... 60-56311

[51] Int. Cl.$^4$ ............... C08K 3/10; C08K 3/26; C08K 3/20
[52] U.S. Cl. ............... 524/322; 523/200; 524/394; 524/405; 524/406; 524/407; 524/413; 524/424; 524/434; 524/435; 524/436; 524/437; 524/524; 524/528
[58] Field of Search ............... 524/440, 441, 525, 424, 524/430, 437, 524, 528, 413, 436, 434, 435, 406, 407, 405, 322, 394

[56] References Cited

U.S. PATENT DOCUMENTS

| | | | |
|---|---|---|---|
| 3,412,125 | 11/1968 | Welch et al. | 252/609 |
| 3,912,671 | 10/1975 | Kondo et al. | 106/306 |
| 3,936,403 | 2/1976 | Sakaguchi et al. | 524/430 |
| 4,193,911 | 3/1980 | Fochesato | 252/8.1 |
| 4,430,470 | 2/1984 | Taniguchi et al. | 524/269 |
| 4,438,228 | 3/1984 | Schenck | 524/528 |
| 4,525,494 | 6/1985 | Andy | 524/528 |
| 4,549,041 | 10/1985 | Shingo et al. | 428/391 |

FOREIGN PATENT DOCUMENTS

| | | |
|---|---|---|
| 0062252 | 10/1982 | European Pat. Off. |
| 0077055 | 4/1983 | European Pat. Off. |
| 1445939 | 11/1976 | United Kingdom |
| 1479083 | 7/1977 | United Kingdom |
| 1540400 | 2/1979 | United Kingdom |
| 1561016 | 2/1980 | United Kingdom |
| 2041960 | 9/1980 | United Kingdom |
| 2156825 | 10/1985 | United Kingdom |
| 2163167 | 2/1986 | United Kingdom |

*Primary Examiner*—Herbert J. Lilling
*Attorney, Agent, or Firm*—Armstrong, Nikaido, Marmelstein & Kubovcik

[57] ABSTRACT

This invention provides a flame-retardant resin composition comprising:

(A) about 100 parts by weight of a base polymer containing about 99 to about 20% by weight of a linear polyethylene and about 1 to about 80% by weight of a polyethylene-α-olefin copolymer having a melt flow rate (MFR) of about 1 to about 10 and a density of about 0.900 to about 0.850, said linear polyethylene having a MFR and a density both restricted to the range defined by a segment having points a, b, c and d at the corners thereof in the accompanying drawing, FIG. 1, showing the relationship between the MFR (according to ASTM D1238) and the density (according to ASTM D1505) of said linear polyethylene, and (B) about 50 to about 300 parts by weight of a hydrate of metallic oxide.

12 Claims, 1 Drawing Sheet

FLAME-RETARDANT RESIN COMPOSITIONS

This application is a continuation-in-part of application Ser. No. 841,136 filed on Mar. 19, 1986, now abandoned.

The present invention relates to flame-retardant resin compositions.

Heretofore known as flame-retardant resin compositions are those prepared using a halogen-containing polymer or by adding an organohalogen flame retardant to non-halogenated polymer. However, the products obtained with use of such flame-retardant resin compositions, although self-extinguishable when taken out from flames, have the drawbacks that they undergo continuous combustion to burn out while in a flame of high temperature as in the event of a fire, they produce a large quantity of smoke, or thermally decompose to release a corrosive or highly toxic acid gas and thus result in a secondary disaster.

On the other hand, attempts have been made to incorporate a halogen-free flame retardant into low density, medium density or high density ethylene homopolymer to overcome the above drawbacks. However, the halogen-free flame retardant needs to be used in a large amount to give fully useful flame retardancy to the resulting resin composition. This results in the following drawbacks. When a large quantity of halogen-free flame retardant is admixed with low density or medium density ethylene homopolymer, the resulting resin composition, when molded or extruded, exhibits seriously reduced mechanical characteristics especially in respect of tensile strength and elongation and is not usable satisfactorily. Further when a large amount of halogen-free flame retardant is incorporated into high density ethylene homopolymer, the molded product prepared from the resin composition obtained similarly shows impaired mechanical characteristics especially in repsect of tensile strength and elongation. Since the mechanical characteristics reduce greatly with time, the molded product fails to retain useful mechanical characteristics. Thus, halogen-free, flame-retardant resin compositions still remain to be developed which are outstanding in flame retardancy and which retain fully useful mechanical characteristics over a prolonged period of time after processing.

An object of the present invention is to provide a halogen-free resin composition having high flame retardancy.

Another object of the present invention is to provide a flame-retardant resin composition which can be molded into a product capable of retaining fully useful mechanical characteristics over a prolonged period of time.

Other features of the present invention will become apparent from the following description.

The flame-retardant resin composition of the present invention comprises:

(A) about 100 parts by weight of a base polymer containing about 99 to about 20% by weight of a linear polyethylene and about 1 to about 80% by weight of a polyethylene-α-olefin copolymer having a melt flow rate (MFR) of about 1 to about 10 and a density of about 0.900 to about 0.850, said linear polyethylene having a MFR and a density both restricted to the range defined by a segment having points a, b, c and d at the corners thereof in the accompanying drawing, FIG. 1, showing the relationship between the MFR (according to ASTM D1238) and the density (according to ASTM D1505) of said linear polyethylene, and (B) about 50 to about 300 parts by weight of a hydrate of metallic oxide.

Figure 1:
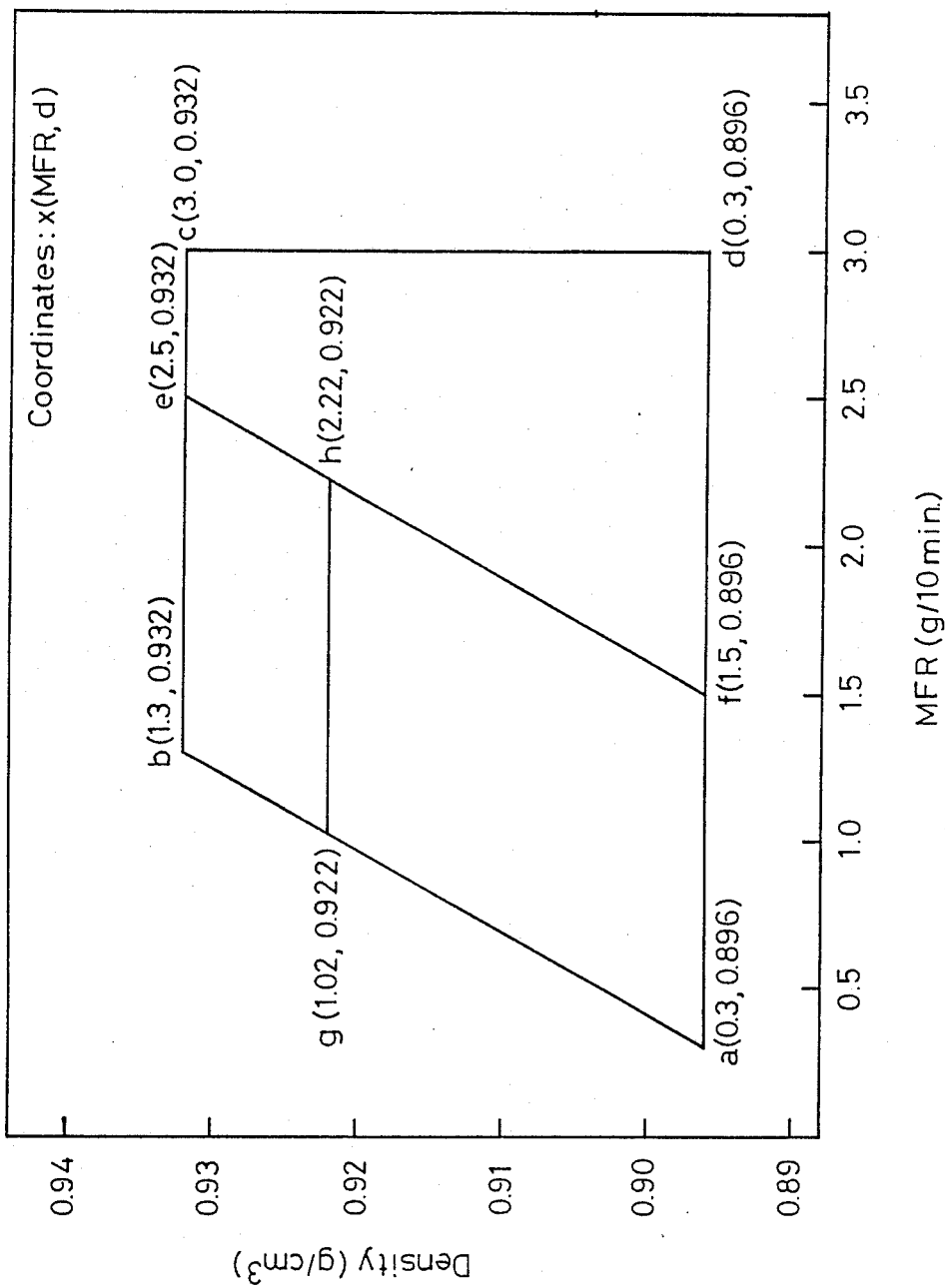
FIG. 1 indicates the MFR plotted as the abscissa and the density as the ordinate.

The linear polyethylene to be used as the component (A) in this invention is a copolymer of ethylene and an olefin monomer having 3 to 16 carbon atoms. The linear polyethylenes usable in the invention are those having the above-specified range of MFR and density. The objects of the invention can be accomplished by the linear polyethylene having these characteristics in the above-specified range, but can not be achieved by linear polyethylenes if outside the foregoing range in MFR and density. It is essential in the invention to use the linear polyethylene having a MFR and density in such range. Further the invention employs the linear polyethylene with the MFR and density in the range defined by a segment having preferably points a, b, e and f, more preferably points a, g, h and f, at the corners of the segment in FIG. 1. These linear polyethylenes can be prepared in substantially in the same manner as known processes for linear polyethylenes, for example, by the following process.

A mixture of ethylene and an olefin having 3 to 16 carbon atoms is polymerized at low pressure in the presence of a catalyst. The mixing ratio between ethylene and olefin is usually about 3 to about 20 parts by weight, preferably about 5 to about 10 parts by weight, of the latter per 100 parts by weight of the former. Examples of useful catalysts are so-called Phillips catalysts typical of which is chromium oxide supported on silica, alumina, zirconia, or silica alumina as a carrier, Ziegler catalysts comprising the combination of compound of a transition metal from Groups IV to VIII of the Periodic Table and an organometallic compound of a metal from Groups I to IV of the Table, etc. More specific examples of useful Ziegler catalysts are combinations of $TiCl_4$ and alkyl aluminums (such as $Al_2(Et_3)Cl_3$, $Al(Et)_2Cl$ and $AlEt_3$). Also useful is a mixture of organomagnesium compound such as $n\text{-}Bu_2Mg\cdot 1/6AlEt_3$, the above Ti compound and a organometallic halide. The catalyst is used usually in an amount of about 0.01 to about 50 parts by weight, preferably about 0.05 to about 20 parts by weight, per 100 parts by weight of the mixture of ethylene and olefin having 3 to 16 carbon atoms. The pressure to be applied for the polymerization is usually atmospheric pressure to about 20 atm., preferably atmospheric pressure to about 10 atm. Examples of preferred processes for preparing the linear polyethylene are disclosed more specifically in Unexamined Japanese Patent Publications (Japan Kokai) 51-112891, 55-45722 and 55-113542 and U.S. Pat. No. 3,957,448.

Of the linear polyethylenes useful for the present invention, especially suitable are those wherein the olefin comonomer copolymerized with the ethylene chain has about 3 to about 10 carbon atoms. More specifically, the most suitable polyethylenes are those wherein the comonomer is butene-1, octene-1 or 4-methylpentene-1.

Examples of the foregoing linear polyethylenes are Mitsubishi Polyethylene-LL X-138, f30F, E11F and F30H (products of Mitsubishi Petrochemical Co., Ltd.), Ultzex 2020L, 3010F and 3021F (products of Mitsui Petrochemical Industries, Ltd.), GRSN-7047 and GRSN-7042 (products of Nippon Unicar Company, Ltd.), Idemitsu Polyethylene-L 0134H, 0234H, Stamylex 1016 and Stamylex 1026 (products of Idemitsu Petrochemical Co., Ltd.), etc.

According to the present invention, the linear polyethylene is used in the form of a mixture with a polyethylene-α-olefin copolymer. The polyethylene-α-olefin copolymer is a copolymer obtained by polymerizing ethylene with a α-olefin having 3 to 8 carbon atoms in the presence of a Ziegler catalyst and has a density of 0.85 to 0.90 and a MFR of 1 to 10. Of such polyethylene-α-olefin copolymers, preferable are those having a density of about 0.87 to about 0.90 and a MFR of about 2 to about 6. Examples of such polyethylene-α-olefin copolymers are TAFMER A-4090, A-4085, P-0180 and P-0480 (products of Mitsui Petrochemical Industries, Ltd.), etc.

When the linear polyethylene and the polyethylene-α-olefin copolymer are used in mixture, the former to latter ratio by weight is usually about 20-99: about 80-1, preferably about 80-30: about 20-70.

When required, the base resin of the invention may contain a relatively small amount of a third base polymer. Examples of useful such third polymers are low density polyethylene, polypropylene, high density polyethylene, ethylene-vinyl acetate copolymer, ethyleneethylacrylate copolymer, etc. The amount of the third polymer to be used in the invention is about 30 parts by weight or less, preferably about 20 parts by weight or less, per 100 parts in combined amount of the base polymer of the invention.

The hydrate of metallic oxide to be used as the component (B) of the invention is, for example, a hydrate of oxide of a metal element from Groups Ia, IIa, IIIb, IVa and IVb of the Periodic Table, or a complex salt or compound of such a hydrate and the carbonate of a metal element from Groups Ia and IIa of the table. Examples of useful hydrates are $Al_2O_3 \cdot nH_2O$ (wherein n is 0.5 to 6, particularly 2.5 to 3.5, hereinafter referred to as "hydrated alumina"), $MgO \cdot nH_2O$ (wherein n is 0.5 to 5, particularly 1.5 to 2.5, hereinafter referred to as "hydrated magnesia"), $BaO \cdot 9H_2O$, $BaO \cdot H_2O$, $ZrO \cdot 2H_2O$, $SnO \cdot nH_2O$ (wherein n is 1 to 10), $3MgCO_3 \cdot Mg(OH)_2 \cdot 3H_2O$, $6MgO \cdot Al_2O_3 \cdot H_2O$, $NaCO_3 \cdot Al_2O_3 \cdot nH_2O$ (wherein n is 1 to 10), $Na_2O \cdot B_2O_3 \cdot 5H_2O$, etc. These hydrates are usable singly, or at least two of them can be used in admixture. In particle size, these metallic oxide hydrates are usually up to about 10 μm, preferably up to about 5 μm. Generally, particle sizes of about 0.1 to about 5 μm are desirable for use. Of these hydrates, hydrated alumina and hydrated magnesia are especially preferred. Examples of such hydrated aluminas are HYGELLITE H-42M (product of Showa Light Metal Co., Ltd.), B1403 and B1403S (products of Nippon Light Metal Co., Ltd.), etc. Suitable hydrated magnesias are those which are 3 to 15 m²/g in specific surface area as determined by the BET method and 0% for 5-micron or larger particles in particle size distribution as determined by the Loozex method. Examles of such hydrated magnesias are KISUMA 5B, KISUMA 5A and KISUMA 5E (products of Kyowa Kagaku Kogyo Co., Ltd.), KX-4S (product of Asahi Glass Co., Ltd.), etc.

According to the present invention, usually about 50 to about 300 parts by weight, preferably about 70 to about 200 parts by weight, more preferably about 90 to about 150 parts by weight, of the component (B) is admixed with 100 parts by weight of the component (A). Use of more than 300 parts by weight of the component (B) entails the drawback that the resulting resin composition exhibits impaired mechanical characteristics. Conversely, with less than 50 parts by weight of the component (B) present, the resin composition has the drawback of reduced flame retardancy.

Preferably, the composition of the present invention has incorporated therein an auxiliary flame retardant such as red phosphorus, zinc borate, titanium dioxide or the like. Examples of useful red phosphorus flame retardants are a wide variety of those commercially available, for example, those at least about 80% in red phosphorus content, up to about 0.8% in weight loss on drying and up to about 7% in plus 74-mesh content. It is desirable that the surface of the red phosphorus particles be covered with a thermosetting resin such as phenolformalin resin or the like. Examples of such red phosphorus flame retardants are NOVARED #120 and NOVARED #120UF (products of Rinkagaku Kogyo Co., Ltd.), etc.

Useful zinc borates are a wide variety of those commercially available. For example, it is desirable to use one represented by the formula $2ZnO \cdot 3B_2O_3 \cdot 3.5H_2O$, about 2 to about 10μ in particle size and about 2.6 to about 2.8 g/cm³ in crystalline density, such as Zinc Borate 2335 (product of Borax Holdings Ltd., England), etc.

Useful titanium dioxides are those commercially available, for example, those containing at least about 90% of $TiO_2$ and wholly minus 100 mesh in particle size, or those containing at least about 90% of $TiO_2$, including none of plus 149-micron particles and having a water content of up to about 0.7%. Examples of such materials are TITONE A-150 and TITONE R-650 (products of Sakai Kagaku Kogyo Co., Ltd.).

According to the present invention, usually about 0.5 to about 50 parts by weight, preferably about 2 to about 25 parts by weight, of the auxiliary flame retardant is used per 100 parts by weight of the component (A). Use of more than 50 parts by weight of the auxiliary flame retardant is not desirable since the resulting resin composition then tends to exhibit lower mechanical characteristics. Conversely, presence of less than 0.5 part by weight of the auxiliary flame retardant results in a tendency for the flame retardancy to fail to exhibit the contemplated effect, hence undesirable.

With the present invention, it is desirable to incorporate an antioxidant into the composition. Examples of useful antioxidants are hindered phenol types and amine types. Various hindered phenol type antioxidants heretofore known are usable which include, for example, [methylene-3-(3,5-di-tert-butyl-4-hydroxyphenol)-propionate]methane (Irganox 1010, product of CIBA GEIGY Corp.), 2,2-thio[diethyl-bis-3-(3,5-di-tert-butyl-4-hydroxyphenol)propionate] (Irganox 1035, product of CIBA GEIGY Corp.), 4,4'-thiobis(3-methyl-6-tert-butylphenol) (SUNTONOX, product of Monsanto Co.), 4,4'-methylenebis(3,5-di-tert-butylphenol) (Ionox 220, product of ICI, England), etc. Various amine type antioxidants heretofore known are also usable, which include, for example, Antioxidant DDA (DDA, product of Bayer AG.), N,N'-di-β-naphthyl-p-phenylenediamine (Nocrac White, product of Ohuchi Shinko Co., Ltd.), N,N'-diphenyl-p-phenylenediamine (Nocrac DP, product of Ohuchi Shinko Co., Ltd.), N,N'-diisopropyl-p-phenylenediamine (Antioxidant No. 23, product of E. I. du Pont de Nemours & Co.), etc. These agents are usable singly, or at least two of them are usable in admixture.

The antioxidant is used usually in an amount of about 0.1 to about 5 parts by weight, preferably about 0.2 to about 3 parts by weight, more preferably about 0.3 to about 2 parts by weight, per 100 parts by weight of the component (A). Use of more than 5 parts by weight of the antioxidant fails to produce a noticeably improved effect and is therefore economically undesirable. With less than 0.1 part by weight of the antioxidant present, it is difficult to achieve the intended aging preventing effect, hence undesirable.

It is desirable to incorporate a higher fatty acid or a metal salt thereof into the composition of this invention as an processing aid. Examples of useful fatty acids are stearic acid, oleic acid and the like, while examples of useful metal salts are zinc salt, calcium salt and the like.

The higher fatty acid or metal salt thereof is used usually in an amount of about 0.1 to about 10 parts by weight, preferably about 0.5 to about 5 parts by weight, per 100 parts by weight of the component (A). Use of more than 10 parts by weight of the acid or salt tends to result in the drawback that the resin composition obtained exhibits impaired properties, for example, in respect of mechanical characteristics. Presence of less than 0.1 part by weight of the processing aid fails to produce the contemplated effect.

It is also desirable to incorporate carbon black into the composition of this invention. Examples of useful carbon black materials are furnace black designated N330 to N351 in ASTM code and 100 to 160 cm$^3$/100 g in DBP oil absorption, and thermal black which is 30 to 50 cm$^3$/100 g in DBP oil absorption. Such materials include FEF carbon black, HAF carbon black, ISAF carbon black, SRF carbon black, etc. More specific examples are Diablack H and Diablack HS (products of Mitsubishi Chemical Industries, Ltd.), Vulcan-3 and Vulcan-3H (products of Cabot Corp.), Seast H and Seast 3H (products of Tokai Electrode Co., Ltd.), Ketjenblack HAF (product of Ketjen Corp.), etc. Of these, Diablack H and Vulcan-3 are desirable.

According to the present invention, usually about 0.5 to about 40 parts by weight, preferably about 1 to about 20 parts by weight, of carbon black is used per 100 parts by weight of the component (A). Use of more than 40 parts by weight of carbon black is undesirable since the resulting resin composition then tends to exhibit impaired mechanical characteristics. With less than 0.5 part by weight of carbon black present, the composition has difficulty in exhibiting ashing characteristics, hence undesirable.

According to the present invention, it is desirable to incorporate a coupling agent into the composition. Various coupling agents heretofore known are usable which include titanate coupling agents such as monoalkoxy, neoalkoxy, coordination, chelate or like type and silane coupling agents. Of such titanate coupling agents, desirable are those containing phosphorus, such as tetra-isopropyl-di(dioctylphosphite)titanate (KR-41B, product of Kenrich Petrochemicals, Inc.), isopropyl-tris(dioctyl-pyrophosphate)titanate (KR38S, product of the same company), bis(dioctylpyrophosphate)oxyacetatetitanate (KR138S, product of the same company), etc.

Examples of useful titanate coupling agents of the chelate type are di-isostearoyloxyacetatetitanate (KR101), dicumylphenol aceoxyacetate-titanate (KR-134S), di(dioctylphosphate)ethylene-titanate (KR-212), 4-aminobenzenesulfonyldodecylbenzenesulfonylethylene-titanate (KR-226S) and di(butylmethylpyrophosphate)ethylene-titanate (KR-262ES) which are products of Kenrich Petrochemicals, Inc.

Preferred silane coupling agents are trialkoxysilanes having a carbon-to-carbon double bond or epoxy group, such as vinyl-tris($\beta$-methoxyethoxysilane) (A172, product of Nippon Unicar Co., Ltd.), $\gamma$-methacryloxypropyltrimethoxysilane (A174, product of the same company), $\beta$-(3,4-epoxycyclohexyl)ethyltrimethoxysilane (A186, product of the same company), $\gamma$-glycidyloxy propyltrimethoxysilane (SH6040, Toray Silicone Co., Ltd.), etc.

The coupling agent is used usually in an amount of about 0.1 to about 5 parts by weight, preferably about 0.3 to about 3 parts by weight, more preferably about 0.5 to about 2 parts by weight, per 100 parts by weight of the component (A). Use of more than 5 parts by weight of the coupling agent is not desirable since the resin composition then obtained tends to exhibit lower flame retardancy and lower thermal resistance. Use of less than 0.1 part by weight of the coupling agent tends to result in impaired processability.

When the component (A) contains a relatively small amount of the aforementioned polypropylene, it is especially desirable to incorporate a copper inhibitor into the composition of this invention. Useful copper inhibitors are a wide variety of those already known, such as N,N'-bis[3-(3',5'-di-tert-butyl-4'-hydroxyphenyl)propionyl]hydrazine, [3-(N-salicyloyl)amino-1,2,4-tetrazole], N,N'-dibenzaloxalyldihydrazide, N,N'-disalicylideneoxalylhyrazide, etc. The copper inhibitor is used usually in an amount of about 0.02 to about 5 parts by weight, preferably about 0.1 to about 2 parts by weight, per 100 parts by weight of the polypropylene. Use of more than 5 parts by weight of the inhibitor is not desirable economically since a noticeably increased effect will not be achieved. With less than 0.02 part by weight present, it becomes difficult to obtain the contemplated the effect.

In addition to the foregoing components, fillers, small amounts of organic flame retardants, plasticizers, pigments and the like, for example, UV stabilzers, antitermites, antirodents, etc. can be incorporated into the composition of this invention.

Examples of useful fillers are metallic oxides such as zinc oxide, magnesium oxide, beryllium oxide, boron oxide and aluminum oxide, carbonates such as magnesium carbonate and calcium carbonate, silicates (such as clay, talc and feldspar powder), graphite, barium sulfate, lithopone, silicas, kieselguhr, mica powder, siliceous sand, slate powder, asbestos, aluminum sulfate, calcium sulfate, molybdenum disulfide, potassium titanate, etc. Such fillers are used usually in an amount of about 5 to about 200 parts by weight, preferably about 10 to about 150 parts by weight, more preferably about 5 to about 50 parts by weight, per 100 parts by weight of the component (A). Use of more than 200 parts by weight of the filler is not desirable since the resulting resin composition tends to exhibit impaired mechanical characteristics. Use of less than 5 parts by weight of the filler fails to produce the contemplated effect and is not desirable.

Examples of useful organic flame retardants are organobromides such as tris(2,3-dibromopropyl)isocyanurate, 2,3-dibromopropyl methacrylate, pentabromotoluene, decabromodiphenyl ether, tetrabromobisphenol S and 2,2'-bis(4-hydroxy-3,5-dibromophenyl)propane, organophosphorusbromide compounds such as bis(2,3-dibromopropyl)dichloropropyl phosphate, organochlorides such as chlorinated paraffin, dimethyl chlorendate, Dechlorane Plas 25 (product of Hooker Chemical Co., U.S.A.), organophosphorus compounds such as phenylphosphonic acid, di(polyoxyethylene)hydroxymethyl phosphonate, etc. These flame retardants are used usually in an amount of about 0.5 to about 10 parts by weight, preferably about 1 to about 5 parts by weight, per 100 parts by weight of the component (A). Use of more than 10 parts by weight of the organic flame retardant results in an objectionable tendency for the resulting resin composition to produce an increased amount of smoke and an increased amount of toxic hydrogen halide gas when burning. Conversely, presence of less than 0.5 part by weight of the organic flame retardant fails to produce the contemplated effect and is not desirable.

Examples of useful plasticizers are naphthenic and aromatic plasticizers, process oil, phthalates, trimellitates, epoxy resins, etc. Such plasticizers are used usually in an amount of about 0.2 to about 50 parts by weight, preferably about 1 to about 10 parts by weight, per 100 parts by weight of the component (A).

Examples of useful pigments are Phthalocyanine Blue, Chrome Yellow, red iron oxide, etc. These pigments are used usually in an amount of about 0.1 to about 20 parts by weight, preferably about 0.5 to about 10 parts by weight, per 100 parts by weight of the component (A).

The resin composition of the present invention can be used as crosslinked. The composition may be crosslinked using, for example, organic peroxide, electron rays, radiation or water. Preferably the composition is crosslinked with use of an organic peroxide or electron rays.

The composition of the present invention can be prepared by uniformly mixing together specified amounts of the desired components given above by a usual method, using a Banbury mixer, Henschel mixer or the like. Although all the components can be mixed together at the same time, it is desirable to admix the coupling agent along with the filler. When two or more kinds of polymers are used as the component (A), it is desirable to uniformly mix the polymers together and to admix the other components with the mixture.

The composition of this invention can be molded by various known methods for use. For example, the composition is kneaded by a kneader such as a rolling mill and then shaped into the desired form for the contemplated use.

Since the composition of the present invention is essentially free from halogen, the composition will not produce large amount of smoke or release any corrosive gas or acid gas owing to thermal decomposition even if allowed to stand in flames of high temperature, for example, in the event of a fire. Moreover, the composition of this invention is outstanding in flame retardancy, tensile strength, brittle point, electrical characteristics, resistance to aging, etc. The composition is therefore useful as a building material, material for pipes, hoses, sheets, sheet covers and walls, covering materials for electric wires and cables (for inner insulations and outer sheaths), etc.

Above all, the composition of the invention is well-suited for use as a flame-retardant resin composition for covering insulations and sheaths of electric wires and cables. In such a case, the composition of this invention is used for electrical insulation layers over suitable portions, for example, over conductors or inner semiconductive layers, of communication cables, power cables, control cables, etc. The composition is usable also for protective layers (sheaths) over suitable portions, e.g., over insulation layers or outer semiconductive layers, of such cables. In these applications, the composition gives the cables high fire resistance, flame retardancy, etc.

The present invention will be described in greater detail with reference to the following examples.

The specimens prepared in these examples were tested for characteristics by the following methods.
Flame retardancy test The composition of the invention was kneaded into a uniform mixture by a rolling mill and then molded into a specimen sheet, 3.0 mm in thickness, by a hot press (pressure 100 to 150 kg/cm$^2$, temperature 180° C., time 10 minutes). The limited oxygen index (LOI) of the sheet was determined according to JIS K 7201 (oxygen index method) to evaluate the flame retardancy. Mechanical characteristics The composition was kneaded and molded into specimen sheets, 1 mm in thickness, in the same manner as above. The sheets were checked for the following characteristics.
(1) Brittle point (°C.) ... according to ASTM D882.
(2) Tensile strength (kg/mm$^2$) ... according to ASTM D882.
(3) Elongation (%) ... according to ASTM D882.

EXAMPLE

Compositions of the present invention were prepared by mixing together specified amounts (in parts by weight) of the components listed in Table 1 (Compositions Nos. 1 to 32) below in the following manner. The base polymer and the flame retardant were uniformly mixed together at a temperature of 130° to 180° C. by a rolling mill and then made into a composition in the form of a sheet.

The compositions thus prepared were tested for flame retardancy and mechanical properties by the above-mentioned methods. Table 2 shows the results.

Table 2 shows the BOC values (balance of characteristics) as calculated by the equation indicated below from the data of each composition on the tensile strength (T.S.), elongation (Elo.) and brittle point ($T_b$) as the parameters for showing the excellency of the composition of the invention in balance of mechanical characteristics:

$$BOC = -[T.S.(kg/mm^2) \times Elo.(\%) \times T_b(°C.)]/1000$$

Table 1 above shows that when the base polymers used were specified linear polyethylenes, the resin compositions obtained were excellent in flame retardancy and balance of mechanical characteristics.

COMPARISON EXAMPLE

For comparison, compositions were prepared from the specified amounts of the components listed in Table 1 (Compositions Nos. 33 to 41) in the same manner as above except that the base polymers used were A-8 to A-13. These compositions were also tested for flame retardancy and mechanical properties with the results given in Table 2 which also shows the BOC values.

The symbols for components used in the following examples stand for the following.
Base polymers A-1: linear polyethylene (Mitsubishi Polyethy-LL X-138, product of Mitsubishi Petrochemical Co., Ltd., MFR=0.5, density=0.900)

A-2: linear polyethylene (Mitsubishi Polyethy-LL E11F, product of Mitsubishi Petrochemical Co., Ltd., MFR=1.2, density=0.91)

A-3: linear polyethylene (Mitsubishi Polyethy-LL F30F, product of Mitsubishi Petrochemical Co., Ltd., MFR=1.0, density=0.92)

A-4: linear polyethylene (Ultzex 2020L, product of Mitsui Petrochemical Industries, Ltd., MFR=2.1, density=0.920)

A-5: linear polyethylene (Mitsubishi Polyethy-LL, F30H, product of Mitsubishi Petrochemical Co., Ltd., MFR=2.0, density=0.920)

A-6: linear polyethylene (Ultzex 3010F, product of Mitsui Petrochemical Industries, Ltd., MFR=1.3, density=0.930)

A-7: linear polyethylene (Ultzex 3021F, product of Mitsui Petrochemical Industries, Ltd., MFR=2.1, density=0.930)

A-8: linear polyethylene (Ultzex 3520L, product of Mitsui Petrochemical Industries, Ltd., MFR=2.1, density=0.935)

A-9: linear polyethylene (GS-650, product of Nippon Unicar Co., Ltd., MFR=0.55, density=0.920)

A-10: linear polyethylene (NUCG-5651, product of Nippon Unicar Co., Ltd., MFR=0.9, density=0.920)

A-11: linear polyethylene (Stamylex 4016, product of Idemitsu Petrochemical Co., Ltd., MFR=1.0, density=0.935)

A-12: linear polyethylene (Stamylex 4046, product of Idemitsu Petrochemical Co., Ltd., MFR=4.0, density=0.935)

A-13: linear polyethylene (Neozex 2006, product of Mitsui Petrochemical Industries, Ltd., MFR=0.7, density=0.922)

A-14: polyethylene-α-olefin copolymer (TAFMER A4090, product of Mitsui Petrochemical Industries, Ltd., MFR=3.6, density=0.89)

A-15: polyethylene-α-olefin copolymer (TAFMER A4085, product of Mitsui Petrochemical Industries, Ltd., MFR=3.6, density=0.88)

Flame retardants

B-1: Mg(OH)$_2$ (KISUMA 5B, product of Kyowa Kagaku Kogyo Co., Ltd.)

B-2: Mg(OH)$_2$ (KX-4S, product of Asahi Glass Co., Ltd.)

B-3: Al(OH)$_3$ (Hygellite H42M, product of Showa Light Metal Co., Ltd.)

B-4: Al(OH)$_3$ (B1403S, product of Showa Light Metal Co., Ltd.)

B-5: $3MgCO_3 \cdot Mg(OH)_2 \cdot 3H_2O$

B-6: $6MgO \cdot Al_2O_3 \cdot H_2O$

Additives

C-1: red phosphorus, (Novared #120, product of Rinkagaku Co., Ltd.)

C-2: zinc borate (Zinc Borate #2335, product of Borax Holding Ltd.)

C-3: titanium dioxide (TITONE A150, product of Sakai Kagaku Kogyo Co., Ltd.)

C-4: silane coupling agent (vinyl-tris(β-methoxyethoxysilane), A172, product of Nippon Unicar Co., Ltd.)

C-5: silane coupling agent (γ-methacryloxypropyltrimethoxysilane, A174, product of Nippon Unicar Co., Ltd.)

C-6: titanium coupling agent (isopropyl-tris(dioctylpyrophosphate)titanate, KR38S, product of Kenrich Petrochemicals, Inc.)

C-7: titanium coupling agent (bis(dioctylpyrophosphate)oxyacetate-titanate, KR138S, product of Kenrich Petrochemicals, Inc.)

C-8: chelate-type titanium coupling agent (di-isostearoyloxyacetate-titanate, KR101, product of Kenrich Petrochemicals, Inc.)

C-9: FEF carbon (Seast SO, product of Tokai Electrode Co., Ltd.)

C-10: HAF carbon (Diablack H, product of Mitsubishi Chemical Industries, Ltd.)

C-11: HAF carbon (Vulcan-3, product of Cabot Corp.)

C-12: stearic acid

C-13: zinc stearate

C-14: polyethylene wax (Nisseki Uniwax, product of Nippon Petrochemical Co., Ltd.)

C-15: antioxidant (3,5-di-tert-butyl-4-hydroxyphenol)propionate, Irganox 1035, product of Ciba Geigy Corp.)

C-16: antioxidant (N,N'-di-β-naphtyl-p-phenylenediamine, Nocrac White, product of Ohuchi Shinko Co., Ltd.)

C-17: antioxidant (N,N'-diisopropyl-p-phenylenediamine, Antioxidant No. 23, product of E. I. du Pont de Nemours & Co.)

C-18: antioxidant (Seenox 412S, Shiraishi Calcium Co., Ltd.)

C-19: antioxidant (tetrakis[methylene-3-(3,5-di-tertbutyl-4-hydroxyphenyl)propionate]methane, Irganox 1010, product of Ciba Geigy Corp.)

C-20: copper inhibitor (N,N'-bis[3-(3',5'-di-tert-butyl-4'-hydroxyphenyl)propionyl]hydrazine)

C-21: copper inhibitor (N,N'-dibenzyl oxalylhydrazide)

C-22: copper inhibitor (N,N'-disalicylidene oxalylhydrazide)

C-23: antioxidant (4,4'-dihydroxy-3,3'-di-tert-butyl-5,5'-dimethyl-diphenylsulfide, Nocrac 300, product of Ohuchi Shinko Co., Ltd.)

C-24: organic flame retardant (decabromodiphenyl ether, PLANELON DB-100, product of Mitsui Toatsu Chemicals, Inc.)

C-25: organic flame retardant (aliphatic polycyclic chlorine compound, Dechloran plas 25, product of Hooker Chemical Co.)

C-26: filler (zinc oxide, Active Zinc Oxide No. 1, product of Honjo Chemical Co., Ltd.)

C-27 filler (magnesium oxide, Kyowamag 100, product of Kyowa Kagaku Kogyo Co., Ltd.)

C-28: filler (Dixie Clay, product of R. T. Vanderbilt)

C-29: filler (graphite, product of Tsuchiya Kaolin Kogyo Co., Ltd.)

C-30: filler (barium sulfate, lithopon, product of Sakai Kagaku Kogyo Co., Ltd.)

TABLE 1

| Component | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| Base polymer | | | | | | | | | | | | | | | | | | | | | | | | | | |
| A-1 | 50 | 50 | — | — | — | — | — | — | — | — | — | — | — | — | — | — | — | 20 | — | — | — | — | — | — | — | — |
| A-2 | — | — | 40 | — | — | — | 25 | — | — | — | — | — | — | — | — | — | — | — | 50 | 20 | — | — | — | — | — | — |
| A-3 | — | — | — | 30 | 50 | 40 | — | — | — | — | — | — | — | — | — | — | — | 20 | — | 20 | 40 | — | — | — | — | — |
| A-4 | — | — | — | — | — | — | — | — | — | — | — | — | — | — | — | — | — | 10 | — | — | — | — | — | — | — | — |
| A-5 | — | — | — | 30 | — | — | 25 | 50 | 50 | 50 | 50 | 50 | 50 | 50 | 90 | 50 | 50 | — | — | — | 30 | 50 | 50 | 80 | 50 | 50 |
| A-6 | — | — | — | — | — | — | — | — | — | — | — | — | — | — | — | — | — | — | — | — | — | — | — | — | — | — |
| A-7 | — | — | — | — | — | — | — | — | — | — | — | — | — | — | — | — | — | — | — | — | — | — | — | — | — | — |
| A-8 | — | — | — | — | — | — | — | — | — | — | — | — | — | — | — | — | — | — | — | — | — | — | — | — | — | — |
| A-9 | — | — | — | — | — | — | — | — | — | — | — | — | — | — | — | — | — | — | — | — | — | — | — | — | — | — |
| A-10 | — | — | — | — | — | — | — | — | — | — | — | — | — | — | — | — | — | — | — | — | — | — | — | — | — | — |
| A-11 | — | — | — | — | — | — | — | — | — | — | — | — | — | — | — | — | — | — | — | — | — | — | — | — | — | — |
| A-12 | — | — | — | — | — | — | — | — | — | — | — | — | — | — | — | — | — | — | — | — | — | — | — | — | — | — |
| A-13 | — | — | 60 | — | — | — | — | — | — | — | — | — | — | — | — | — | — | — | — | — | — | — | — | — | — | — |
| A-14 | 50 | 50 | — | 40 | 50 | 60 | 50 | 50 | 50 | 50 | 50 | 50 | 50 | 50 | 10 | 50 | 50 | 20 | 20 | 30 | 30 | 50 | 50 | 20 | 50 | 50 |
| A-15 | — | — | — | — | — | — | — | — | — | — | — | — | — | — | — | — | — | 30 | 30 | 30 | — | — | — | — | — | — |
| Flame retardant | | | | | | | | | | | | | | | | | | | | | | | | | | |
| B-1 | 100 | 100 | 100 | 120 | 100 | 120 | — | — | 100 | 100 | 200 | 130 | 100 | 100 | 120 | — | — | 100 | 100 | 120 | — | — | — | — | — | — |
| B-2 | — | — | — | — | — | — | 150 | 150 | — | — | — | — | — | — | — | — | — | — | — | — | — | — | 120 | 120 | — | — |
| B-3 | — | — | — | — | — | — | — | — | — | — | — | 50 | — | — | — | 150 | 150 | — | — | — | 150 | 150 | — | — | 150 | 150 |
| B-4 | — | — | — | 5 | — | — | — | — | — | — | — | 10 | — | — | — | — | — | 20 | 10 | 10 | — | — | 10 | 10 | — | — |
| B-5 | — | — | — | — | — | — | 5 | 5 | — | — | — | 10 | — | — | — | — | — | — | 10 | — | — | — | — | — | — | — |
| B-6 | — | — | — | — | — | — | — | — | — | — | — | — | — | — | — | — | — | — | — | — | — | — | — | — | — | — |
| Additives | | | | | | | | | | | | | | | | | | | | | | | | | | |
| C-1 | 10 | 10 | 10 | 5 | 10 | 10 | — | — | 10 | 10 | — | — | 10 | 10 | 10 | — | — | — | — | 10 | — | — | 10 | — | — | — |
| C-2 | — | — | — | — | — | — | 5 | — | — | — | — | — | — | — | — | — | — | — | — | — | — | 5 | — | 5 | — | — |
| C-3 | — | — | — | — | — | — | — | 5 | — | — | — | — | — | — | — | — | — | — | — | — | — | — | — | — | — | — |
| C-4 | — | — | — | — | — | — | 0.5 | 0.5 | — | — | — | — | — | — | — | — | — | — | — | — | — | — | — | — | — | — |
| C-5 | — | — | — | — | — | — | — | — | — | — | — | — | — | — | 1 | — | — | — | — | — | — | — | — | — | — | — |
| C-6 | — | — | — | — | — | — | — | — | — | 0.5 | 0.5 | 0.5 | — | — | — | — | — | — | — | — | — | — | — | — | — | — |
| C-7 | — | — | — | — | — | — | — | — | — | — | — | — | — | — | — | — | — | — | — | — | — | — | 0.5 | — | — | — |
| C-8 | — | — | — | 0.5 | — | — | 0.5 | 0.5 | — | — | — | — | — | — | — | — | — | — | — | — | — | 0.5 | — | 0.5 | — | — |
| C-9 | — | — | — | 0.5 | — | — | 0.5 | 0.5 | — | — | — | 0.5 | — | — | — | — | — | — | — | 0.5 | — | — | — | — | — | — |
| C-10 | 10 | 10 | 10 | — | 10 | 10 | — | — | 10 | 10 | — | — | 10 | 10 | 10 | 5 | — | — | 5 | 10 | 5 | 5 | — | 5 | — | — |
| C-11 | — | — | — | — | — | — | — | — | — | — | — | — | — | — | — | — | — | — | — | — | 5 | — | — | — | — | — |
| C-12 | 2 | 2 | 2 | — | 2 | 2 | — | — | 2 | 2 | — | — | 2 | 2 | 2 | 2 | 2 | — | — | — | — | 5 | 5 | 5 | — | — |
| C-13 | — | — | — | — | — | — | — | — | — | — | — | — | — | — | — | — | — | — | — | — | — | 2 | 2 | 2 | — | — |
| C-14 | — | — | — | — | — | — | — | — | — | — | — | — | — | — | — | — | — | — | — | — | — | — | — | — | — | — |
| C-15 | — | — | — | — | — | — | 0.5 | 0.5 | — | — | — | — | — | — | — | — | — | — | — | — | — | — | — | — | — | — |
| C-16 | — | — | — | — | — | — | 0.5 | 0.5 | — | — | — | — | — | — | — | — | — | — | — | — | — | — | — | — | — | — |
| C-17 | — | — | — | — | — | — | — | — | — | — | — | — | — | — | — | — | — | — | — | — | — | — | — | — | — | — |
| C-18 | — | — | — | — | — | — | — | — | — | — | — | — | — | — | — | — | — | — | — | — | — | — | — | — | — | — |
| C-19 | — | — | — | — | — | — | — | — | — | — | — | — | — | 1 | — | — | 1 | — | 1 | 1 | 1 | 1 | 1 | 1 | — | — |
| C-20 | 0.2 | — | — | 0.2 | — | — | 0.2 | 0.2 | — | — | — | — | — | — | — | — | — | — | — | — | — | — | — | — | — | — |
| C-21 | — | — | 0.1 | — | 0.1 | — | — | — | — | — | 0.1 | 0.1 | — | — | — | — | — | — | — | 0.5 | 0.2 | — | — | — | — | — |
| C-22 | 1 | 1 | 1 | — | 1 | 1 | — | — | 1 | 1 | 0.5 | 0.5 | 1 | 1 | 1 | 1 | 1 | — | — | — | — | — | — | — | — | — |
| C-23 | — | — | — | — | — | — | — | — | — | — | — | — | — | — | — | — | — | — | — | — | — | — | — | 1 | — | — |
| C-24 | — | — | — | — | — | — | — | — | — | — | 10 | — | — | — | — | — | — | — | — | — | — | — | — | — | — | — |
| C-25 | — | — | — | — | — | — | — | — | — | — | — | — | — | — | — | — | — | — | — | — | — | — | — | — | — | — |
| C-26 | — | — | — | — | — | — | — | 5 | — | — | — | — | — | — | — | — | — | 5 | — | — | — | — | — | — | — | — |

TABLE 1-continued

| | | | | | | | | | | | | | | | |
|---|---|---|---|---|---|---|---|---|---|---|---|---|---|---|---|
| C-27 | — | — | — | — | — | — | — | — | — | — | — | — | — | — | — |
| C-28 | — | 5 | — | — | — | — | — | — | — | — | — | — | — | — | — |
| C-29 | — | 5 | 5 | — | — | — | — | — | — | — | — | — | — | — | — |
| C-30 | — | — | — | — | — | — | — | — | — | — | — | 5 | — | — | 5 |

| | Composition No. | | | | | | | | | | | | | | |
|---|---|---|---|---|---|---|---|---|---|---|---|---|---|---|---|
| Component | 27 | 28 | 29 | 30 | 31 | 32 | 33 | 34 | 35 | 36 | 37 | 38 | 39 | 40 | 41 |
| Base polymer | | | | | | | | | | | | | | | |
| A-1 | 50 | — | — | 25 | — | — | — | — | — | — | — | — | — | — | — |
| A-2 | — | 50 | 40 | — | — | — | — | — | — | — | — | — | — | — | — |
| A-3 | — | — | 40 | 25 | — | — | — | — | — | — | — | — | — | — | — |
| A-4 | — | — | — | — | — | — | — | — | — | — | — | — | — | — | — |
| A-5 | — | — | — | — | — | — | — | — | — | — | — | — | — | — | — |
| A-6 | — | — | — | — | — | — | — | — | — | — | — | — | — | — | — |
| A-7 | — | — | — | — | — | — | — | — | — | — | — | — | — | — | — |
| A-8 | — | — | — | — | 50 | — | — | — | — | — | — | — | — | — | — |
| A-9 | — | — | — | — | — | 50 | — | — | — | — | — | — | — | — | — |
| A-10 | — | — | — | — | — | — | 50 | 50 | 50 | 50 | 50 | 50 | — | — | — |
| A-11 | — | — | — | — | — | — | 50 | — | — | — | — | — | 95 | 90 | 90 |
| A-12 | — | — | — | — | — | — | — | — | — | — | — | — | — | — | — |
| A-13 | — | — | — | — | — | — | — | — | — | — | — | — | 5 | 10 | 10 |
| A-14 | 50 | 50 | 60 | 50 | 50 | 50 | — | 50 | 50 | 50 | 50 | 50 | — | — | — |
| A-15 | — | — | — | — | — | — | — | — | — | — | — | — | — | — | — |
| Flame retardant | | | | | | | | | | | | | | | |
| B-1 | 120 | 120 | — | — | 100 | 100 | — | 100 | 150 | 150 | 100 | 100 | 100 | — | — |
| B-2 | — | — | 150 | 150 | — | — | 150 | — | — | — | — | — | — | — | — |
| B-3 | — | — | — | — | — | — | — | — | — | — | — | — | — | 20 | 400 |
| B-4 | — | — | — | — | — | — | — | — | — | — | — | — | — | — | — |
| B-5 | — | — | — | — | — | — | — | — | — | — | — | — | — | — | — |
| B-6 | — | — | — | — | — | — | — | — | — | — | — | — | — | — | — |
| Additives | | | | | | | | | | | | | | | |
| C-1 | — | — | — | — | 10 | 10 | — | 10 | 10 | — | 10 | 10 | — | — | — |
| C-2 | — | — | — | — | — | — | — | — | — | 5 | — | — | — | — | — |
| C-3 | — | — | — | — | 2 | 2 | — | 2 | 2 | 2 | 2 | 2 | — | — | — |
| C-4 | — | — | — | — | — | — | 2 | — | — | — | — | — | — | — | — |
| C-5 | — | — | — | — | — | — | — | — | — | — | — | — | — | — | — |
| C-6 | — | — | — | — | — | — | — | — | — | — | — | — | — | — | — |
| C-7 | — | — | — | — | — | — | — | — | — | — | — | — | — | — | — |
| C-8 | — | — | — | — | — | — | — | — | — | — | — | — | — | — | — |
| C-9 | — | — | — | — | — | — | — | — | — | — | — | — | — | — | — |
| C-10 | — | — | — | — | — | — | — | — | — | — | — | — | — | — | — |
| C-11 | — | — | — | — | — | — | — | — | — | — | — | — | — | — | — |
| C-12 | — | — | — | — | — | — | — | — | — | — | — | — | — | — | — |
| C-13 | — | — | — | — | — | — | — | — | — | — | — | — | — | — | — |
| C-14 | — | — | — | — | — | — | — | — | — | — | — | — | — | — | — |
| C-15 | — | — | — | — | — | — | — | — | — | — | — | — | — | — | — |
| C-16 | — | — | — | — | — | — | — | — | — | — | — | — | — | — | — |
| C-17 | — | — | — | — | — | — | — | — | — | — | — | — | — | — | — |
| C-18 | — | — | — | — | — | — | — | — | — | — | — | — | — | — | — |
| C-19 | — | — | — | — | — | — | — | — | — | — | — | — | — | — | — |
| C-20 | — | — | — | — | — | — | — | — | — | — | — | — | — | — | — |
| C-21 | — | — | — | — | — | — | — | — | — | — | — | — | — | — | — |

TABLE 1-continued

| | | | | | | | | | | | | | | | |
|---|---|---|---|---|---|---|---|---|---|---|---|---|---|---|---|
| C-22 | — | — | — | — | — | — | — | — | — | — | — | — | — | — | — |
| C-23 | — | — | — | — | — | — | — | — | — | — | — | — | — | — | — |
| C-24 | — | — | — | — | — | — | — | — | — | — | — | — | — | — | — |
| C-25 | — | — | — | — | — | — | — | — | — | — | — | — | — | — | — |
| C-26 | — | — | — | — | — | — | — | — | — | — | — | — | — | — | — |
| C-27 | — | — | — | — | — | — | — | — | — | — | — | — | — | — | — |
| C-28 | — | — | — | — | — | — | — | — | — | — | — | — | — | — | — |
| C-29 | — | — | — | — | — | — | — | — | — | — | — | — | — | — | — |
| C-30 | — | — | — | — | — | — | — | — | — | — | — | — | — | — | — |

TABLE 2

| Characteristics | Composition No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Flame retardancy | | | | | | | | | | | | | | |
| LOI | 31.1 | 31.1 | 31.1 | 30.3 | 30.7 | 29.8 | 34.4 | 34.8 | 30.3 | 29.8 | 34.8 | 35.2 | 31.1 | 30.7 |
| Mechanical properties | | | | | | | | | | | | | | |
| T.S., kg/mm² | 1.34 | 1.30 | 1.38 | 1.35 | 1.28 | 1.33 | 1.20 | 1.21 | 1.08 | 1.10 | 1.05 | 1.16 | 1.33 | 1.31 |
| Elo., % | 605 | 600 | 590 | 585 | 610 | 595 | 450 | 430 | 550 | 560 | 410 | 420 | 500 | 580 |
| Brittle point, °C. ($T_b$) | −42 | −45 | −47 | −42 | −38 | −40 | −35 | −30 | −30 | −32 | −30 | −28 | −30 | −32 |
| Total performance (BOC) = (T.S. × Elo. × $T_b$)/1000 | 34.0 | 35.1 | 38.2 | 33.1 | 29.6 | 31.6 | 18.9 | 15.6 | 17.8 | 19.7 | 12.9 | 13.6 | 20.0 | 24.3 |

| Characteristics | Composition No. | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Flame retardancy | | | | | | | | | | | | | | |
| LOI | 34.6 | 33.4 | 32.5 | 31.1 | 30.4 | 33.4 | 30.7 | 31.1 | 33.4 | 33.8 | 32.5 | 32.0 | 32.5 | 31.6 |
| Mechanical properties | | | | | | | | | | | | | | |
| T.S., kg/mm² | 1.40 | 1.34 | 1.32 | 1.38 | 1.39 | 1.42 | 1.29 | 1.35 | 1.42 | 1.41 | 1.12 | 1.11 | 1.21 | 1.19 |
| Elo., % | 550 | 590 | 580 | 520 | 530 | 505 | 490 | 500 | 535 | 515 | 595 | 580 | 545 | 550 |
| Brittle point, °C. ($T_b$) | −30 | −30 | −32 | −35 | −33 | −32 | −29 | −28 | −30 | −28 | −33 | −30 | −31 | −32 |
| Total performance (BOC) = (T.S. × Elo. × $T_b$)/1000 | 23.1 | 23.7 | 24.4 | 25.1 | 24.3 | 22.9 | 18.3 | 18.9 | 22.8 | 20.3 | 22.0 | 19.3 | 20.4 | 20.9 |

| Characteristics | Composition No. | | | | | | | | | | | | | |
|---|---|---|---|---|---|---|---|---|---|---|---|---|---|---|
| | 29 | 30 | 31 | 32 | 33 | 34 | 35 | 36 | 37 | 38 | 39 | 40 | 41 | |
| Flame retardancy | | | | | | | | | | | | | | |
| LOI | 31.6 | 31.6 | 32.0 | 32.5 | 29.1 | 30.3 | 32.5 | 32.5 | 30.7 | 30.7 | 29.1 | 20.1 | 35.8 | |
| Mechanical properties | | | | | | | | | | | | | | |
| T.S., kg/mm² | 1.16 | 1.13 | 1.10 | 1.09 | 0.88 | 0.78 | 0.72 | 0.64 | 0.90 | 0.90 | 0.70 | 1.65 | 0.15 | |
| Elo., % | 525 | 515 | 380 | 420 | 395 | 50 | 310 | 240 | 35 | 30 | 195 | 520 | 10 | |
| Brittle point, °C. ($T_b$) | −30 | −30 | −28 | −25 | −18 | −20 | −28 | −25 | −20 | −15 | −19 | −30 | −5 | |
| Total performance (BOC) = (T.S. × Elo. × $T_b$)/1000 | 18.3 | 17.5 | 11.7 | 11.4 | 6.25 | 0.78 | 6.24 | 3.84 | 0.63 | 0.41 | 2.59 | 25.7 | 0.01 | |

Table 2 shows that the compositions of the invention are superior in flame retardancy, mechanical properties and balance of characteristics (BOC) to the compositions prepared in Comparison Example.

We claim:

1. A flame-retardant resin composition comprising:
   (A) about 100 parts by weight of a base polymer containing about 99 to about 20% by weight of a linear polyethylene and about 1 to about 80% by weight of a polyethylene-α-olefin copolymer having a melt flow rate (MFR) of about 1 to about 10 and a density of about 0.900 to about 0.850, said linear polyethylene having a MFR and a density both restricted to the range defined by a segment having points a, b, c and d at the corners thereof in the accompanying drawing, FIG. 1, showing the relationship between the MFR (according to ASTM D1238) and the density (according to ASTM D1505) of said linear polyethylene, and
   (B) about 50 to about 300 parts by weight of a hydrate of metallic oxide.

2. A composition according to claim 1 wherein the base polymer contains about 80 to about 30% by weight of said linear polyethylene and about 20 to about 70% by weight of said polyethylene-α-olefin copolymer.

3. A composition according to any one of claims 1 or 2 wherein the linear polyethylene has a MFR and density both restricted to the range defined by a segment having points a, b, e and f at the corners thereof in FIG. 1 showing the MFR-density relationship.

4. A composition according to any one of claims 1 to 2 wherein the linear polyethylene has a MFR and density both restricted to the the range defined by a segment having points a, g, h and f in the corners thereof in FIG. 1 showing the MFR-density relationship.

5. A composition according to any one of claims 1 to 2 wherein the polyethylene-α-olefin has a density of about 0.870 to about 0.900 and a MFR of about 2 to about 6.

6. A composition as defined in any one of claims 1 to 2 wherein the hydrate of metallic oxide is at least one compound selected from the group consisting of hydrated alumina, hydrated magnesia, $3MgCO_3 \cdot Mg(OH)_2 \cdot 3H_2O$ and $6MgO \cdot Al_2O_3 \cdot H_2O$.

7. A composition as defined in any one of claims 1 to 2 which comprises 100 parts by weight of the component (A) and about 70 to about 200 parts by weight of the component (B).

8. A composition as defined in any one of claims 1 to 2 further comprising an auxiliary flame retardant.

9. A composition as defined in any one of claims 1 to 2 further comprising antioxidants.

10. A composition as defined in any one of claims 1 to 2 further comprising a higher fatty acid or a metal salt thereof as a processing aid.

11. A composition as defined in any one of claims 1 to 2 further comprising carbon black.

12. A composition as defined in any one of claims 1 to 2 further comprising a coupling agent.

* * * * *